UNITED STATES PATENT OFFICE.

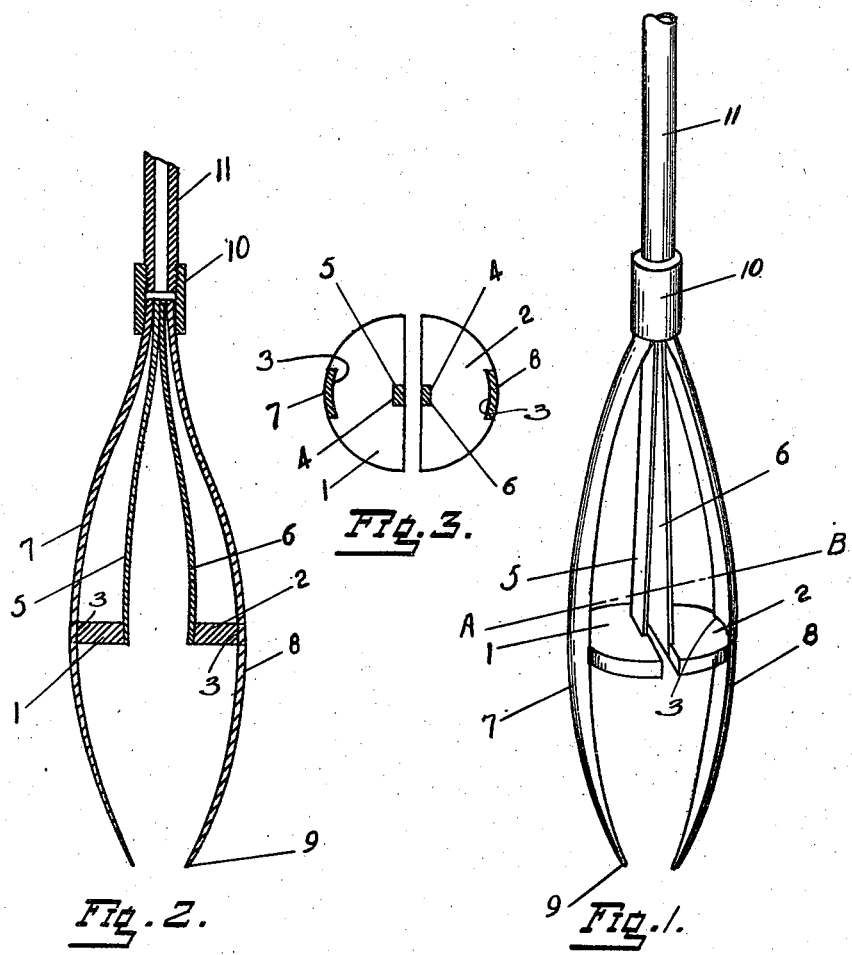

ARTHUR JOHN MULLINER, OF SHEDIAC, NEW BRUNSWICK, CANADA.

FLUE-CLEANER.

1,211,212.  Specification of Letters Patent.  Patented Jan. 2, 1917.

Application filed December 7, 1914. Serial No. 875,893.

*To all whom it may concern:*

Be it known that I, ARTHUR JOHN MULLINER, a subject of the King of Great Britain, and resident of the town of Shediac, county of Westmoreland, Province of New Brunswick, in the Dominion of Canada, have invented certain new and useful Improvements in Flue-Cleaners, of which the following is a specification.

The invention relates to improvements in flue cleaners as described in the present specification and shown in the accompanying drawings that form part of the same.

The invention consists essentially of the novel construction, whereby the scrapers are centered in entering the pipe and flexibly arranged in relation to one another.

The objects of the invention are to facilitate the cleaning of pipes and flues, and generally to provide a simple cheap and durable instrument for the said purpose.

In the drawings, Figure 1 is a perspective view of the device complete. Fig. 2 is a vertical sectional view. Fig. 3 is a cross sectional view on the line A—B of Fig. 1.

Like numerals of reference indicate corresponding parts in each figure.

Referring to the drawings, 1 and 2 are the scrapers having sharp square outer edges and made in half moon shape and in each scraper in the center of the outer edge the recess 3 and in the center of the inner edge the recess 4.

5 and 6 are spring arms rigidly secured to the scrapers 1 and 2 respectively in the recesses 4, said arms at their lower ends springing one from the other thus having a tendency to spread the scrapers outwardly.

7 and 8 are guide arms rigidly secured intermediate of their length to the scrapers 1 and 2 in the recesses 3, said guide arms 7 and 8 being bowed and at their lower ends terminating in the points 9 and at their upper ends welded with the upper ends of the arms 5 and 6 into a pipe coupling 10.

11 is a handle in pipe form screw threaded into the coupling 10.

In the use of this invention the cleaner is guided into the pipe by means of the inwardly converging ends 9 of the guide arms 7 and 8 and as the wider portion of the arms 7 and 8 comes into contact with the walls of the pipe the disks 1 and 2 are forced together forming a complete circular disk which when forced upwardly or downwardly in the pipe thoroughly scrapes the accumulated crust or other matter from the walls. The outer guide arms 7 and 8 serve to steady the device and also form very effectual means of cleaning the pipe or flue as by twisting the cleaner they also remove crust from the inner wall of the flue thus having two functions, namely guiding and aiding in the cleaning of said flue.

What I claim is:

A flue cleaner comprising a handle, a collar at the end of said handle, a pair of scrapers inserted in said collar and extending therefrom and describing perfect opposing arcs from said collar to their outer ends, a pair of spring arms inserted in said collar between said scrapers and extending outwardly and terminating slightly beyond the longitudinal center of said scrapers, and a pair of semi-circular disk scrapers secured at their straight sides to said spring arms and on their curved sides to the aforesaid scrapers.

Signed at the city of Moncton, New Brunswick, this twentieth day of November, 1914.

ARTHUR JOHN MULLINER.

Witnesses:
 JAMES WILLIAM GLEASON,
 JOHN McLEAN.